United States Patent [19]

McBride

[11] 4,386,055
[45] May 31, 1983

[54] OZONATOR WITH AIR ACTUATED ROTOR

[75] Inventor: Thomas D. McBride, Washington Township, Bergen County, N.J.

[73] Assignee: Joan McBride, Westwood, N.J.

[21] Appl. No.: 218,369

[22] Filed: Dec. 19, 1980

[51] Int. Cl.³ .............................................. C01B 13/12
[52] U.S. Cl. .................................. 422/186.18; 55/31; 210/760; 422/186.14
[58] Field of Search .................... 210/760; 422/186.07, 422/186.12, 186.13, 186.14, 186.18, 186.19; 55/131

[56] References Cited

U.S. PATENT DOCUMENTS

| | | | |
|---|---|---|---|
| 1,991,668 | 2/1935 | Hartman | 422/186.18 |
| 2,159,206 | 5/1939 | Daily | 422/186.14 |
| 2,778,796 | 1/1957 | Trub | 422/186.14 |
| 3,336,099 | 8/1967 | Czulak et al. | 210/760 X |
| 3,775,314 | 11/1973 | Beitzel et al. | 210/760 |
| 3,967,131 | 6/1976 | Slipiec et al. | 422/186.18 |

FOREIGN PATENT DOCUMENTS 753352 10/1933 France .......................... 422/186.07

*Primary Examiner*—Leland A. Sebastian
*Attorney, Agent, or Firm*—Ralph R. Roberts

[57] ABSTRACT

The apparatus for producing a desired quantity of ozone uses a flow of air in which a corona discharge utilizes high voltage to produce sparks. This apparatus includes a source of high voltage and the spark is produced when metal or conducting edge portions of the blades are moved in way of spaced conductors carried in a tubular confine. The blades are carried as an assembly which may be rotated by a flow of air. The flow of air and the turning of the assembly maintains the blades in a cooled condition so that unwanted burning of the edges of the blades does not occur. The corona discharged ozone may be used in swimming pools, or as an air purifier or dust eliminator. The ozone, when used in a closed building, will utilize a timer so an excess of ozone is not produced. The rotating of the bladed member is preferably by the flow of air, said volume of air flow regulates the speed of rotation.

21 Claims, 6 Drawing Figures

OZONATOR WITH AIR ACTUATED ROTOR

BACKGROUND OF THE INVENTION

1. Field of the Invention

The present invention is to an ozonator, which is a type of chemical reactor apparatus.

2. Description of the Prior Art

Ozone ($O_3$) is a gas and was discovered in the mid-nineteenth century but its widespread use has only been after the 1950's and is used for environmental pollutant control. Ozonators have become popular in commercial use for rectifying man-made pollution. Ozone is a three atom allotrope of oxygen and is second only to fluorine in electro-negative oxidation potential. Although a natural ingredient of the earth's atmosphere it has become widely used to improve water quality. Ozone is an extremely efficacious oxidant which does not persist as a residual element in air and water treatment.

The widespread use of swimming pools as back yard recreational means and in municipal recreational associations has given rise to the making of the water used therein safe for swimming. In recent years chlorine pellets and the like have been used as the cost has been low and the test for concentration has been relatively simple. Chlorine and similar chemicals has been less than satisfactory in pools as this chemical addition has now become rather expensive and said chlorine has often adversely affected the eyes and skin of many swimmers. The rubber and like materials used in swim suits and pool equipment have also been adversely affected by these chemicals with discoloration and deterioration as a result. As and of itself chlorine-like pellets and like components are very dangerous and require careful handling and safe storage away from children and pets.

For many years ozone has been recognized as an outstanding bacteriacide and virus deactivant. Ozone is most economically produced by creating a "corona discharge." This occurs when electrons flow at sufficiently high potential through a gas such as air. In household air the addition of small amounts of ozone freshens the air and removes unwanted odors. Ozone is widely used to remove odors from waste dumps and to purify or alter stack gasses. An investigation and/or evaluation will indicate to what extent the addition of ozone to the air will control bacteria count and odors.

The production of ozone is shown in many prior U.S. Pat. Nos. among which are 599,455 as issued Feb. 22, 1893 and 744,096 as issued Nov. 17, 1903 to OTTO. These patents show "corona discharge" and motor driven components. They do not show adjustability for corona discharge or an air driven rotor. LINDER has U.S. Pat. Nos. 951,443 which issued on Mar. 8, 1910 and 969,547 which issued on Sept. 6, 1910. These also showed power rotated spark generator components. LINDERMANN disclosed a fixed ozone generator in U.S. Pat. No. 1,363,000 issued Dec. 21, 1920. DALY disclosed a water purifier in U.S. Pat. No. 1,865,433 issued on July 5, 1932. HARTMAN patented an ozone generator utilizing air moved by a fan in U.S. Pat. No. 1,991,668 issued Feb. 19, 1935.

More recent and incidentally much more complicated and expensive generators are shown in BLAIR, U.S. Pat. Nos. 3,365,383 as issued Jan. 23, 1968; ARFF, 4,049,552 as issued Sept. 20, 1977; GNEUPEL, 4,159,971 as issued in July 3, 1979; STOPKA, 4,176,061 issued Nov. 27, 1979; HUTTER, 4,101,783 as issued July 18, 1978; and SAYLOR, 4,314,995 as issued July 29, 1980. These patents and others as far as is known do not disclose a cylindrical generator with a rotor which brings atmospheric air into the ozone generation chamber. This chamber of applicant's invention utilizes the inflow of air to move metal blades in way of electrodes or conductors so that high voltage sparks can produce ozone. The rotating blades enable and insure that deterioration of the potential conductor ends does not occur.

SUMMARY OF THE INVENTION

This invention may be summarized, at least in part, with reference to its objects. It is an object of this invention to provide, and it does provide, an ozone generator in which atmospheric air is fed to an ozone generating chamber and this inflow of air impinges upon blades of a rotatable member. Said blades have conducting means that are rotated to bring their edges in way of adjustably spaced multi-conductors so that the desired corona discharge is produced with no appreciable burning of the edges.

It is a further object of this invention to provide, and it does provide, an ozone generator having metal screen blades carried by anti-friction bearings of jewel or the like pivots, these blades are carried by and with a conductor shaft which carries one side of a high voltage potential. The other side of this high voltage potential is fed to a metal screen disposed next to an outer support in which are mounted adjustable screws. These screws are adjusted so as to space and provide a gap for corona discharge. The circuit providing the rotation of the blade carrying member also may include a timer.

In brief, this summary of the invention pertains to an ozone generator in which incoming air is used to drive and rotate blades of a windmill or like device used therewith. These blades each have a conducting capability extending from a center shaft to the outer edges. These blade ends or edges are spaced from the ends of conducting screws, said screws engage a screen carried around the rotor blades. These screws are connected to one of the legs of the high voltage potential. The rotating blades are preferably a metal screen but may be metal embedded in plastic. The screen members forming the blades are of conducting metal and are attached to the shaft. Said shaft is also an electrical conductor with high voltage fed to the ends of the blades. Air is fed into the chamber by a positive pump or a fan or by negative pressure created when fluid flow is made through a filter and thence to a swimming pool or other body of water. It is to be noted that electrical codes require that a primary supply voltage be conventionally "ground fault protected" and in all installations such protection is contemplated.

As shown, a cylindrical member carries a plurality of adjustable metal screws whose shanks each are engaged in a close mesh screen acting as a conductor. This screen is preferably inside of the cylinder member. Each screw is adjusted to provide a determined spark spacing so that the desired corona discharge can be made. In one embodiment it is to be noted that the high voltage is also connected to a electro-static precipitator for removing dust from air passing through the ozone generator. The precipitator is used with the ozone generator for purification of the air into the room or house and for removal of undesirable odors such as from a kitchen, basement or bedroom. The high voltage is anticipated to be from six to fifteen thousand volts with a very low amperage consuming less than fifty or sixty watts. The air pump requires very low amperage at one hundred ten volts and a fan is also shown in another embodiment. The sparks developed for and in the corona discharge make or produce heat and the movement of air through the cylindrical chamber and the rotational movement of the blades past the ends of the adjusting screws during ozone generation produces a desired cooling effect.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen specific embodiments of ozone generators utilizing air flow for rotating the blades and showing a preferred means for using the generating apparatus for swimming pools and the like and for purifying the air. These specific embodiments have been chosen for the purposes of illustration and description as shown in the accompanying drawings wherein:

Figure 1:
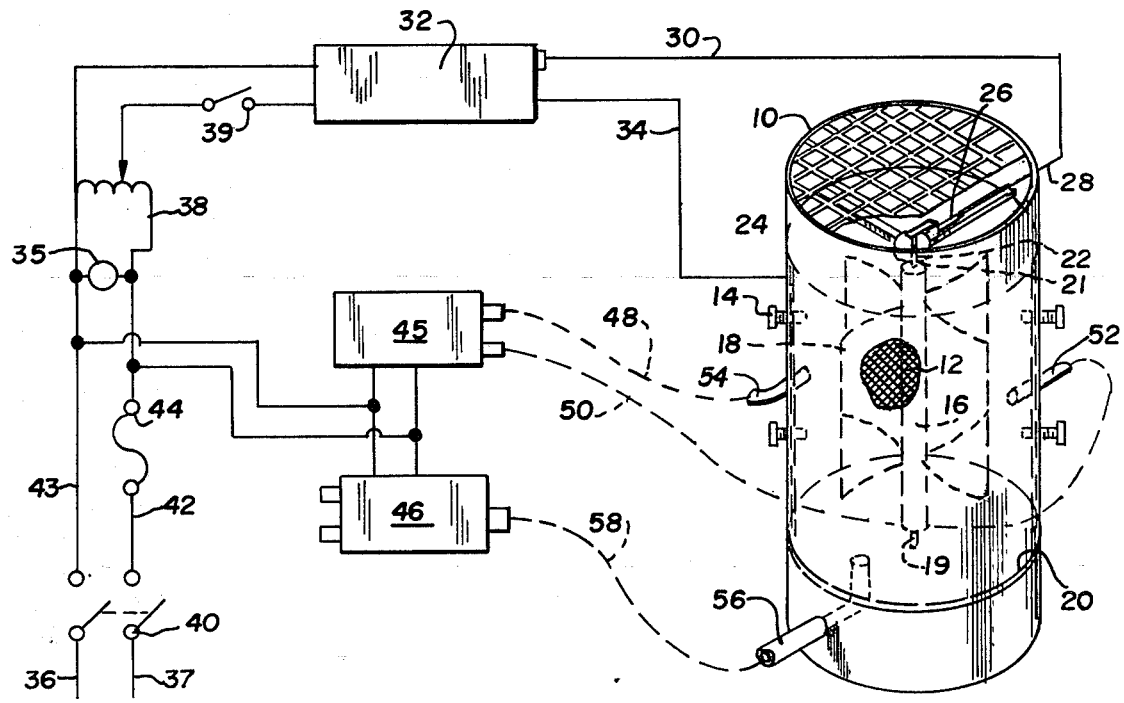
FIG. 1 represents a somewhat diagrammatic, isometric view showing ozone producing apparatus in which ozone is produced by a corona discharge of high voltage, and also showing a circuit diagram for the operation of said ozone producing apparatus.

In the drawings to be more fully described below it is contemplated that at least the high voltage transformer and conductors will be housed in an equipment container so that any potential or voltage current leak will be positively contained. This box or container has not been shown since any shape, configuration and composition of material is merely a matter of preference and selection.

In the following description and in the claims various details are identified by specific names for convenience. These names are intended to be generic in their application. Corresponding reference characters refer to like members throughout the several figures of the drawings.

The drawings accompanying, and forming part of, this specification disclose details of construction for the purpose of explanation but structural details may be modified without departure from the concept and principles of the invention and the invention may be incorporated in other structural forms than shown.

DESCRIPTION OF THE PREFERRED EMBODIMENT

Embodiment as seen in FIG. 1

Referring next to the drawings and in particular to FIG. 1, the ozone generator includes a cylindrical housing 10 which is preferably of plastic or other non-electrical conducting material. Adjacent the inner wall of this cylinder and inwardly of the ends thereof is a conducting screen 12 that provides one distributation means for high voltage electricity. In the side walls of this cylindrical housing are formed a plurality of threaded apertures in which adjusting screws 14 are mounted. The shank of each screw is threaded through a threaded aperture and passes through the screen to engage said screen and provide an electrical conducting path to the inner ends of each screw. Screen 12 is conventionally of metal such as stainless steel and is of a mesh that is sufficiently close that the shank of each screw firmly engages the screen to provide a positive conductor. Of course, the screen 12 may be eliminated with a conductor lead provided to each adjustable screw.

A rotatable conductor for the other leg of the high voltage includes a shaft 16 which is preferably an extrusion of metal and is adapted to receive and retain blade members 18. Preferably these blade members are of screen-type metal and as shown are four in number. Each blade is preferably slightly curved to increase the ability of each blade to rotate under the influence of a directed air stream. A lower end of shaft 16 is supported and carried by a bearing, a jewel journal or the like 19 in and by a disk 20 which is secured in the lower end of the cylindrical housing. The upper end of this same shaft 16 has a reduced portion 21 carried in a bearing or jewel or the like 22. This bearing is carried and supported by an upper disk 24. This reduced portion conventionally extends above the upper supporting disk 24 and is rotatably connected to a spring contact member 26 which may be a carbon block or cup contact and from thence to a flexible lead 28 extending to the wall of the cylindrical chamber 10.

In the depicted circuit for supplying high voltage to the generator many components are identified and are used in the apparatus wherein full and variable control is desired. This circuit may be reduced for economic reasons as in FIG. 6. A conductor 30 extends from a high voltage side of a transformer 32. This conductor is connected to spring contact member 26. The other side of transformer 32 (ground) is connected by a conductor 34 (usually flexible) to the screen or grid 12. A timer 35 is depicted as actuated by the flow of current in low voltage A.C. lines 36 and 37 and leading to adjustable transformer 38. This transformer is used to bring the high voltage transformer 32 into actuation and the output from the high voltage transformer to the ozone generating apparatus is from six to fifteen thousand volts. The low voltage transformer output also is shown with a timed closed control switch 39 which is actuated with and by the timer 35. Switch 40 is actuated to feed low voltage to conductors 42 and 43. A fuse 44 is also shown in one lead or conductor to protect the circuit in case of overload. The closing of switch 40 also provides a flow of current to an input air pump 45 and as depicted an output pump 46.

From air pump 45 the output is fed through conductors 48 and 50 to inlet nozzles 52 and 54 where pressurized air is caused to be directed by said impinging nozzles so as to direct the blast of air onto the blades 18 to provide a rotation of the assembly of the bladed conductor. Two nozzles 52 and 54 are shown but as few as one or as many as several may be used to direct the influent flow of air to induce rotation of the bladed apparatus. This rotated assembly, when carrying a high voltage, provides a corona discharge of sparks passing to the ends of the screws 14. The screw ends are adjusted in and out so the spark space is about one-half inch from each other and the rotation of this conductor varies from less than a hundred to as much as two hundred r.p.m. This speed is not critical and many factors determine the rotational speed including friction, air velocity, size of impinging nozzles, closeness of screen mesh and others. The ozone produced in the cylinder is drawn through collector 56 and thence through a conductor 58 to pump 46 and thence through flexible conductors not shown to the bottom of the swimming pool or like body of water to be treated. It is to be noted that ozone is also very beneficial to aerate water in ponds having fish.

Figure 2:
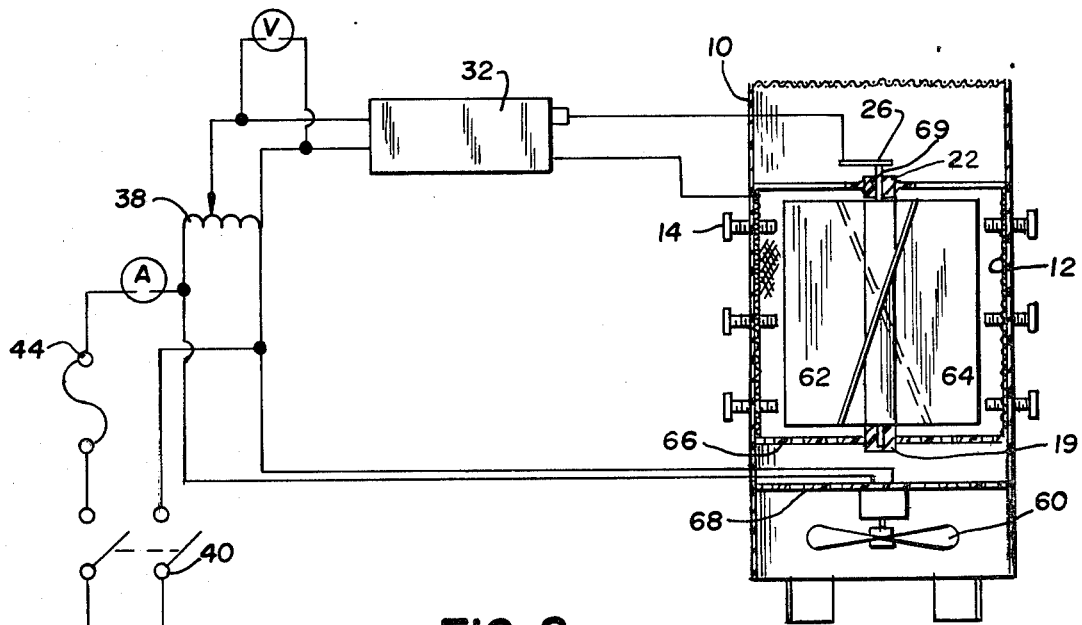
FIG. 2 represents a sectional side view, partly diagrammatic, and showing an ozone generator in which the rotor portion is driven by air moved by a fan, this generator also showing a circuit diagram for the operation of this ozone producing apparatus.

Embodiment of FIG. 2

Referring next to FIG. 2, there is shown an alternate construction of the ozone generator of FIG. 1. The cylinder 10, screen 12 and screws 14 are like that above. Rather than air pump 46 and nozzles 52 and 54 the air within the chamber is moved by a fan 60 and the rotating conductor has angled blades 62 which are canted so as to induce rotation by the directing of air thereagainst and thereby. These blades are carried by attaching means provided by shaft 64. A jewel or bearing 19 as in FIG. 1 is secured to and carried by a perforated disk 66. This disk may also be a screen material of non-conducting material. Fan 60 is carried by support means 68 disposed to allow the free passage of air thereby.

The upper end of this shaft 64 is carried by and supported by a jewel or bearing 22 as in FIG. 1 above. A disk-like support means 68 is provided and is perforated or a screen that allows the passage of ozone carrying air. The upper end of this shaft 64 extends through the jewel or bearing and is engaged by a carbon block or contact 69. This block is carried by a spring member 26 (FIG. 1) so that conduction of high voltage for the conductor to the shaft end is made. This construction is very conventional. The produced air-bearing ozone exits from the top or bottom of the cylinder 10, as depicted, and by the directional rotation of the fan 60. The high voltage produced by transformer 32 receives the conventional A.C. and may also have a duration timing device, not shown, that establishes the duration of ozone produced by a confined area. The timer may be utilized to insure that excess ozone is not present or produced.

Figure 3:
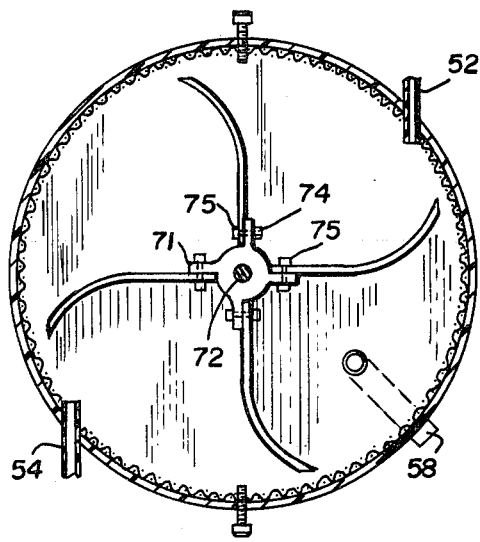
FIG. 3 represents a sectional view in an enlarged scale and showing the arrangement of components for and of the ozone generator of FIG. 1.

Enlarged Sectional View as in FIG. 3

In FIG. 3 is shown an enlarged sectional view of the apparatus of FIG. 1 showing the construction that is used for a controlled volume of ozone. The cylindrical member 10 has a conducting screen 12 adjacent to and held by the wall of the cylindrical member 10. Adjusting screws 14 have their shanks mounted in threaded apertures in this cylindrical member. These shanks are in contact with and conduct interiorally the high voltage carried by the conductive screen 12. Screen-type metal blades 70 provide members which are secured to extending rib portions 71 of a shaft 72 which preferably is an extrusion. Bolts and nuts 74 and 75 secure the blades to this shaft portion. These blades are preferably made of screen-type metal and are spaced so that the outer edges may pass by the inner ends of screws 14 to provide the spark or corona discharge. High voltage is passed or conducted across the space therebetween. The inlet nozzles 52 and 54 are disposed tangentially to cause the inflow of air to impinge upon these blades and cause the shaft mounted assembly to turn. The produced ozone is withdrawn from the chamber through a conductor 58 carried and mounted in the lower disk 20 (FIG. 1).

Figure 4:
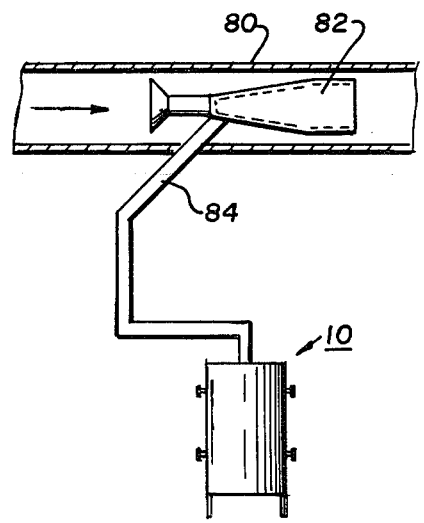
FIG. 4 represents a diagrammatic sectional side view of a negative pressure producing apparatus which may be used with fluid flow under pressure.

Apparatus of FIG. 4

In FIG. 4 there is shown a connection whereby ozone produced in the cylindrical member 10 may be fed into a water conductor 80. Ozone is fed into the interior of this reduced pressure producing member 82 through a conductor 84 and is drawn into and mixes with the water in the conductor 80. Ozone and air, as a mixture, is fed into the area of reduced pressure (venturi tube) so that a suction of the product is fed into the flow of water or fluid. Although this is an apparatus that can be used in the feeding of ozone into the fluid flow in said conductor 80, it is to be noted that where the pipe may be filled with water a check valve, not shown, may be inserted in the conductor line 84 so that any water or fluid as a backfeed is prevented from reaching the high voltage section.

Figure 5:
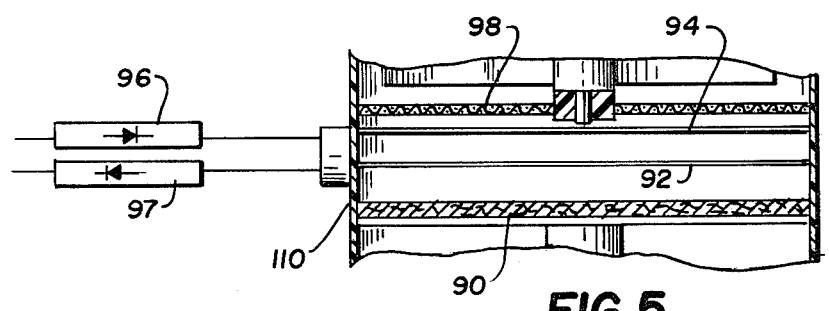
FIG. 5 represents a fragmentary, sectional, side view of apparatus that may be added to the ozone generator of FIG. 2 to produce electrostatic precipitation of dust particles in the air.

Dust Precipitator as in FIG. 5

In FIG. 5 it is to be realized that the apparatus of FIG. 2 for producing ozone is altered so as to also remove dust from the atmosphere by additions to the apparatus which includes a lower filter 90. Said filter 90 is carried within housing 110 and an electrostatic field is provided and electrical conductors 92 and 94 are shown as connected to a source of high voltage and half-wave rectifiers 96 and 97 provide positive and negative current flow to insure removing unwanted particles of dust. In this field the particles of dust are charged and collected on an upper filter 98. Electrostatic precipitators for collecting dust are well known and the high voltage as provided in the ozone producing apparatus may also be used for dust precipitators. The particles of dust are electrostatically charged and are collected on screens by electrostatic precipitation which is more-or-less conventional and well known. A thermal protector and sensor are preferably provided in said added apparatus so as to detect excessive heat and prevent fire.

Figure 6:
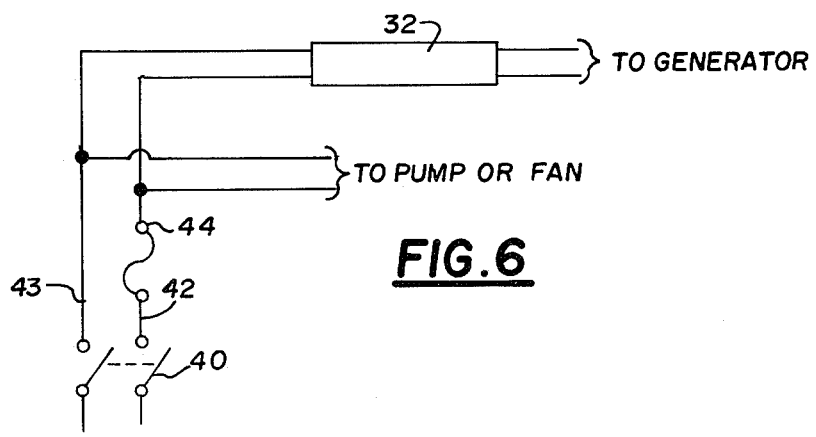
FIG. 6 represents an alternate, partial circuit diagram showing the high voltage circuit of FIG. 1 arranged to produce high voltage with a minimum of associated electrical apparatus and producing said voltage with a minimum cost.

Circuit of FIG. 6

In FIG. 6 there is shown the circuit of FIGS. 1 and 2 as altered to require an absolute minimum of electrical components. The A.C. of conventional voltage is fed to switch 40 as above. A fuse 44 and the high voltage transformer 32 are as above described. The leads or conductors 42 and 43 may power pumps 45 and 46 as in FIG. 1 or may power fan 60 as in FIG. 2. This "bare bones" circuit is shown since it is contemplated that such an electrical circuit probably will be used in commercial applications where the components producing the high voltage and ozone will be in a safety enclosure and that all necessary adjustments and assembly are made at the factory or repair shop.

General Use

It is to be realized that the apparatus as shown is useful in both swimming pools, ponds or tanks and utilizes a high voltage electrical flow to rotating apparatus in which blades have conducting means extending to their tips. These blades and the apparatus associated therewith are moved at selected speeds. The corona discharge or spark passing from the tips of these blades to the ends of the adjusting screws enable the length and frequency of these sparks to be produced without burning of the conducting ends or tips of the blades.

The above described ozone generators, since they use high voltage, are preferably housed in a safety enclosure. This enclosure is contemplated to have a safety switch or disconnect if and when the enclosure is opened to inspect and/or repair and adjust the generator. A fuse is shown in the circuit and is adapted to "blow" when excessive amperage is drawn by the generator and associated apparatus. A time delay may or may not be used since the inflow of air through the jets causes the rotor assembly to turn under the influence of the influent stream of produced air. Electrical codes do not allow any electrical current within a given distance of a swimming pool. Usually the specified distance is about ten feet except for underwater lightening to which this invention does not pertain. To conform to this distance code a long length of plastic tubing can and is used to carry the produced ozone to said pool. This can be accomplished since the ozone is always a pressurized gas moved by the pump so said ozone can always be delivered through almost any desired length of tubing. The output end of this length of tubing is conventionally weighted and may have a commercial member such as Flexi-Mist (TM Blue Ribbon Pet Products) air stone mounted at the end of said tubing to disperse the ozone. The ozone produced can also be fed into the intake of a swimming pool pump used with a filter system.

It is to be noted that the screws 14 are the preferred electrical conductors but this is not to preclude the use of metal, rod-like members slidable in receiving means formed or provided in the tubular or cylindrical member 10. The conducting screen 12 is preferably disposed adjacent the inner diameter of member 10 but the conductor from the high voltage transformer 36 need not be to a screen 12 but may be a grid of conductors. The blades 18 are depicted as of screen-type mesh and of conducting metal but may be of plastic with wire or metal conductors extending to the outer edge by attaching means. The shaft 16 may be of non-conducting plastic with conducting wires affixed thereto and connected to conductors in the blades.

A carbon block or contact 69 is shown and is readily available but other contacting and current carrying means are known and contemplated. Fan 60 is a conventional bladed member rotated with and by readily available A.C. but other air propelling means may be provided including a squirrel cage blower. The filtering of the air fed to the ozone producing apparatus is only shown as an additional benefit to the apparatus. It is readily acknowledged that the apparatus must be tested and approved by all regulatory agencies. The ozone producing apparatus, when used with an outdoor pool, contemplates the generating of a volume of ozone for a period of time and poses no potential problem as excess ozone is dispelled in the atmosphere. In a building or house either for a pool, sauna, or an air purifier, the in and out transfer of atmosphere providing seal effectiveness of the building is a consideration. A positive timer is contemplated so that produced ozone does not exceed the acceptable limits established by regulatory agencies.

Terms such as "left," "right," "up," "down," "bottom," "top," "front," "back," "in," "out" and the like are applicable to the embodiments shown and described in conjunction with the drawings. These terms are merely for the purposes of description and do not necessarily apply to the position in which the ozone producing apparatus may be constructed or used.

While particular embodiments of the generating apparatus have been shown and described it is to be understood the invention is not limited thereto and protection is sought to the broadest extent the prior art allows.

I claim:

1. Apparatus in and by which ozone is produced by a corona discharge in the presence of flowing air, said apparatus including:
    (a) a source of high voltage delivered to said apparatus by at least first and second electrical current conductors;
    (b) a housing adapted to receive said conductors and having a tubular confine in which a supporting means is formed and in which there is a plurality of adjustably mounted electrical conducting members carried in said supporting means and in current conducting association with one of said electrical conductors;
    (c) a first electrical conductive means supported by and arranged about the tubular confine and connecting the adjustable means to one side of the source of high voltage;
    (d) a shaft member positioned substantially at the axis of said tubular confine portion of the housing and carrying a plurality of substantially rigid and like positioned blades, each blade disposed in a plane substantially normal to the axis of the shaft and providing an assembly which is carried by associated bearing means, and as an assembly is moved in a rotational manner with each blade having electrical conducting means provided at its outer edge portions and as the blades are moved to sweep in a circular path;
    (e) a second electrical conducting means leading from the source of high voltage to the conducting means provided at the outer edge portion of each blade;
    (f) means for producing a rotation of the blade assembly, and
    (g) means for conducting the produced ozone from within the tubular confine portion of the housing, said ozone produced by said corona discharge of high voltage when and as the conducting outer edge portions of the rotatably moving blades are brought near to, opposite and past a plurality of electrical conducting members spaced a selected distance from said conducting outer edge portion of the blades so that a corona discharge is discontinuously produced when and as the rotating blade is moved therepast and high voltage is caused to flow as an arc through an air supply.

2. Apparatus for producing ozone as in claim 1 in which the first conductive means carried by the tubular confine is a metal grid which conductively engages each of the adjustable conducting members.

3. Apparatus for producing ozone as in claim 2 in which the metal grid is a screen and the adjustable electrical conducting members are screws whose shanks engage the screen.

4. Apparatus for producing ozone as in claim 3 in which the screen is carried inside the tubular confine and the screws are adjustably carried in and by threaded apertures formed in the tubular housing.

5. Apparatus for producing ozone as in claim 4 in which the tubular confine is made of a non-conducting material such as plastic.

6. Apparatus for producing ozone as in claim 1 in which the shaft member is carried by anti-friction bearings carried by end members within the confine and the shaft and blades are of conductive metal.

7. Apparatus for producing ozone as in claim 1 in which the blades are of metal screening and each are attached to the metal shaft.

8. Apparatus for producing ozone as in claim 7 in which the air is brought to the tubular confine as pressurized air and through conduits the pressurized air is delivered through inlet nozzles and with said air directed so as to impinge the facing surface of the blades.

9. Apparatus for producing ozone as in claim 8 in which the ozone and air as a mixture is drawn from the tubular confine by collector and conduit means to a pump for delivery to a body of water such as a swimming pool.

10. Apparatus for producing ozone as in claim 1 in which said shaft member is carried by bearings, each bearing mounted in perforated end members carried in the tubular confine and with the shaft having attached canted blade members adapted to be urged by a flow of air from a fan induced source to rotate said shaft and attached blades.

11. Apparatus for producing ozone as in claim 10 in which the fan is carried at one end of the tubular confine and the ozone is mixed with the flowing air and exits from the other end of the tubular confine.

12. Apparatus for producing ozone as in claim 11 in which there is provided a metal grid carried by the tubular confine and the adjustable electrical conducting members are screws whose shanks engage the grid, said screws carried in and moved in and out in threaded apertures in the tubular confine.

13. Apparatus for producing ozone as in claim 1 in which the shaft has extending wings to each of which is removably attached a blade.

14. Apparatus for producing ozone as in claim 13 in which the blade is of screen-like metal material slightly curved to increase the efficiency of the blade.

15. Apparatus for producing ozone as in claim 13 in which the blades are arranged in a skewed condition.

16. Apparatus for producing ozone as in claim 1 in which the plurality of electrical conducting members are screws that project adjustably inwardly toward the conducting edges of the blades with the space sufficient to produce a corona discharge thereacross.

17. Apparatus for producing ozone as in claim 16 in which the flowing air is delivered by a pump that is activated when the high voltage is conducted to the apparatus.

18. Apparatus for producing ozone as in claim 16 in which the flow of air through the tubular confine causes the shaft and the blades which are attached in a skewed manner to be moved with and in a rotating manner.

19. Apparatus for producing ozone as in claim 18 in which there is also associated with the fan moving the air an electronic dust precipitator including an electrically charged screen adapted to collect the dust particles from the flow of air as caused by the fan.

20. Apparatus for producing ozone as in claim 1 in which the tubular confine is substantially impervious to the flow of air and said tubular confine is formed with an air conducting passage therein and therethrough, said flow of air directed to and toward the blades so as to engage the sides of the blades to cause the assembly to be rotated in response to the flow of air.

21. Apparatus for producing ozone as in claim 20 in which the flow of air is caused to flow against the tubular confine in a manner so as to cool the spark conductor ends to prevent unwanted burning of the conducting means provided at the outer edge portion of each blade.

* * * * *